US009392128B2

(12) United States Patent
Okada

(10) Patent No.: US 9,392,128 B2
(45) Date of Patent: Jul. 12, 2016

(54) IMAGE FORMING SYSTEM, IMAGE PROCESSING APPARATUS, IMAGE FORMING APPARATUS, AND METHOD FOR CALIBRATING AN IMAGE PROCESSING APPARATUS THAT PERFORMS IMAGE PROCESSING ON A PRINT JOB TO OBTAIN A CORRECTED PRINT RESULT

(71) Applicant: CANON KABUSHIKI KAISHA, Tokyo (JP)

(72) Inventor: Hideyuki Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/552,451

(22) Filed: Nov. 24, 2014

(65) Prior Publication Data

US 2015/0146250 A1    May 28, 2015

(30) Foreign Application Priority Data

Nov. 28, 2013  (JP) .................................. 2013-245762

(51) Int. Cl.
*H04N 1/00* (2006.01)
*G06K 15/00* (2006.01)
*G06K 15/02* (2006.01)

(52) U.S. Cl.
CPC .......... *H04N 1/00087* (2013.01); *G06K 15/005* (2013.01); *G06K 15/1881* (2013.01); *G06K 15/40* (2013.01); *H04N 1/00031* (2013.01); *H04N 1/00053* (2013.01); *H04N 1/00063* (2013.01); *H04N 2201/0094* (2013.01)

(58) Field of Classification Search
None
See application file for complete search history.

(56) References Cited

U.S. PATENT DOCUMENTS

| 6,616,262 | B2 * | 9/2003 | Nakajima et al. | 347/19 |
| 6,950,197 | B1 * | 9/2005 | Nakajima | 358/1.1 |
| 7,580,152 | B2 * | 8/2009 | Kimura | 358/1.9 |
| 7,609,414 | B2 * | 10/2009 | Kumada et al. | 358/1.9 |

FOREIGN PATENT DOCUMENTS

JP       2000318266 A      11/2000

* cited by examiner

*Primary Examiner* — Paul F Payer
(74) *Attorney, Agent, or Firm* — Canon U.S.A., Inc. IP Division

(57) ABSTRACT

A printer apparatus performs notification of an execution instruction for second calibration to a print server based on a result of first calibration, stores time information on the notification, and transmits the time information to the print server in response to a request from the print server. The print server performs a warning to prompt a user to execute the second calibration when the execution instruction for the second calibration notified from the printer apparatus is received. The print server acquires the time information from the printer apparatus when the print server is started, and performs the warning when the time information indicates a date and time later than a date and time indicated by previously acquired time information that has been stored in the print server.

13 Claims, 13 Drawing Sheets

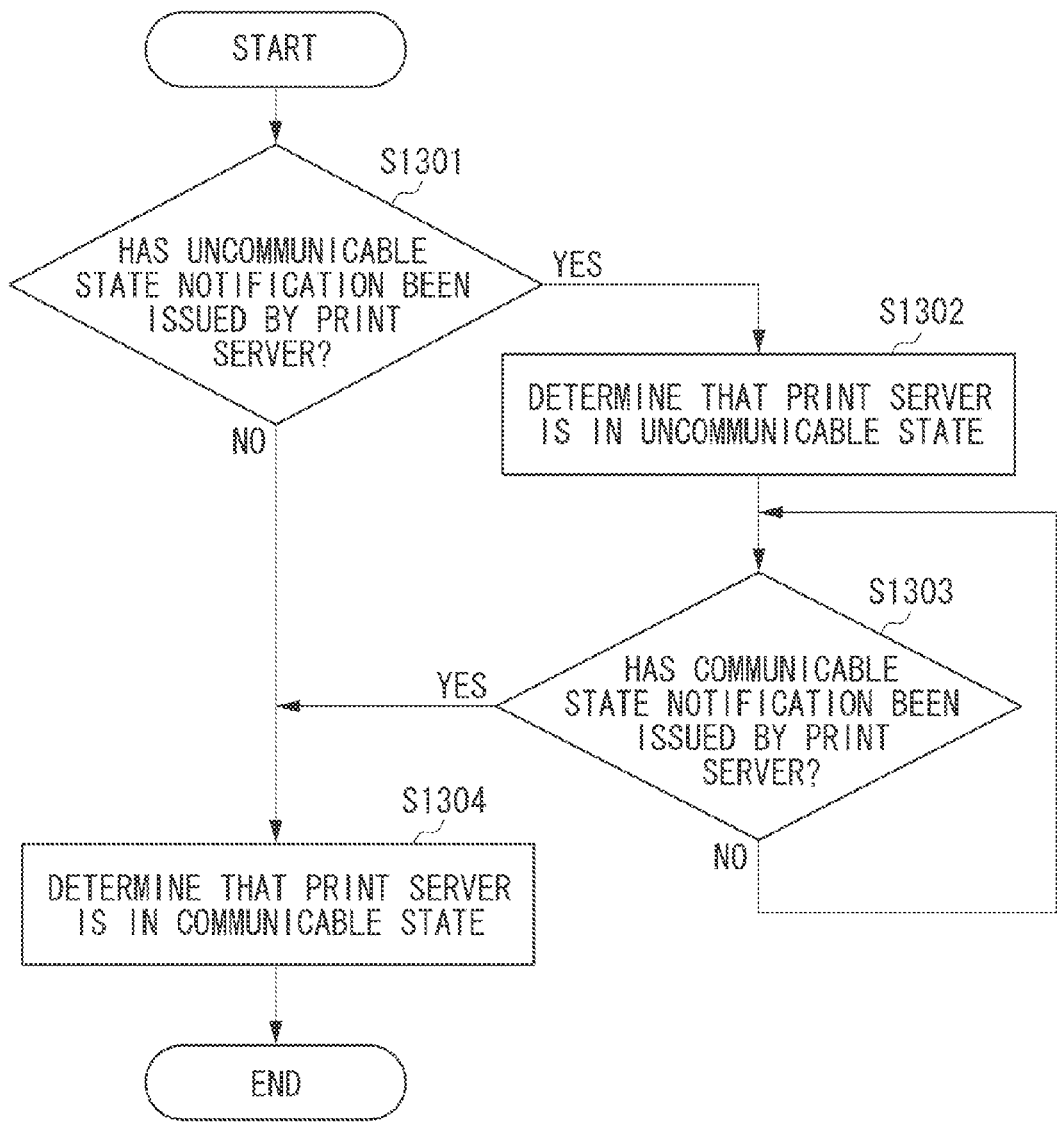

IMAGE FORMING SYSTEM, IMAGE PROCESSING APPARATUS, IMAGE FORMING APPARATUS, AND METHOD FOR CALIBRATING AN IMAGE PROCESSING APPARATUS THAT PERFORMS IMAGE PROCESSING ON A PRINT JOB TO OBTAIN A CORRECTED PRINT RESULT

BACKGROUND OF THE INVENTION

1. Field of the Invention

The present invention relates to a control for executing calibration in an image forming system including an image forming apparatus and an image processing apparatus that performs image processing on a print job and inputs the processed print job to the image forming apparatus.

2. Description of the Related Art

It has been generally known that print characteristics in a printer apparatus, as an image forming apparatus, are influenced and changed by the environment in which the printer apparatus is installed. The change in the print characteristics is mainly caused by change in temperature and humidity of the installed environment, change due to aging of the continuously used apparatus, component replacement in the apparatus, and the like. The change in the print characteristics causes change in the density and the tint of an output print product, and thus there is a problem that a stable print result cannot be obtained.

In a production market where print products are commercialized, achieving a stable print result is a highly important task. Thus, calibration (calibration processing) is executed to keep the variable print characteristics constant.

The calibration processing is executed so as to perform correction to achieve target print characteristics, defined in the printer apparatus in advance. The print characteristics include solid characteristics and halftone characteristics. As the calibration for the solid characteristics, for example, laser emission intensity, a device voltage, and the like at the time of image forming may be adjusted to maintain constant solid density of an image to be printed. As the calibration for the halftone characteristics, for example, a gradation correction look up table (LUT) is updated based on the result of a test print to maintain constant halftone density of an image to be printed.

The calibration processing is basically executed according to an instruction from a user. Thus, the calibration is executed at timing decided by the user, and thus might not be executed at appropriate timing. For example, when the calibration is not executed for a long period of time, a problem arises that the change in the print characteristics in the printer apparatus accumulates, and thus an appropriate print result cannot be obtained.

A technique for uniformly managing an execution timing of the calibration in the printer apparatus has been discussed (see Japanese Patent Application Laid-Open No. 2000-318266). In a technique discussed in Japanese Patent Application Laid-Open No. 2000-318266, time elapsed after the calibration has been executed is managed, and a warning prompting the user to perform the calibration is displayed when a predetermined time or more elapses.

In a system in which printing is performed by using the printer apparatus and a print server (image processing controller) connected to the printer apparatus, the calibration processing can be independently executed in each apparatus. Each calibration processing is executed to correct the print characteristics of the printer apparatus.

The calibration processing in the print server is executed after the calibration processing is executed in the printer apparatus to achieve higher accuracy. Thus, an appropriate effect can only be obtained when the print characteristics in the printer apparatus are kept constant.

Thus, for example, when the execution timing of the calibration processing in the print server is managed based on the elapsed time, the appropriately corrected print result might not be obtained when the calibration processing is executed in the printer apparatus. There are some printer apparatuses that can execute processing of automatically correcting the print characteristics in the printer apparatus, in addition to the calibration that the user arbitrarily performs. Also in such a case, the appropriately corrected print result might not be obtained. In view of this situation, the following method has been also discussed. Specifically, whether to execute the calibration processing in the print server is determined when the calibration processing is executed in the printer apparatus. Thus, an instruction to execute the calibration is issued to the print server when required.

In the system in which the printing is performed by using the print server connected to the printer apparatus, usually, the printer apparatus and the print server are each provided with an independent power source. Thus, it is also possible to operate the printer apparatus only or the print server only. When the setting of the print server is changed, the print server may need to be restarted so that the content of the change is reflected in the system. The print server turned OFF or being restarted as described above cannot receive the execution instruction for the calibration from the printer apparatus.

The following technical approach can be employed. Specifically, a unit that determines whether the execution instruction for the calibration is successfully transmitted may be provided, and the printer apparatus may repeat the transmission of the execution instruction until the print server receives the execution instruction. Unfortunately, the technical approach is highly inefficient because when the print server receives the execution processing is unclear.

Power saving, in electronic devices, is under vigorous development due to factors such as regulation that has been recently enacted in Europe. Thus, print servers that transition to a low power mode, such as a sleep mode, have been increased. In such a low power mode, a control is performed so as to prevent the print server from needlessly recovering from the low power mode. Thus, a received external access is ignored except for the access such as a print job that requires recovering of the print server.

The calibration processing needs not to be executed in the print server even when the calibration processing is executed in the printer apparatus, unless the print server is used immediately. Specifically, the calibration processing might be executed in the printer apparatus before the print server, recovered from the low power mode to execute the calibration, is used. Thus, it might be necessary to execute the calibration again in the print server. Thus, in many cases, a control is performed so that the print server in the low power mode ignores the execution instruction for the calibration to the print server, from a view point of power consumption.

All things considered, the print server might not be able to execute the calibration, even when the execution instruction for the calibration is issued to the print server from the printer apparatus. Thus, the appropriately corrected print result might not be obtained.

SUMMARY OF THE INVENTION

The present invention is directed to a technique capable of appropriately calibrating an image processing apparatus that performs image processing on a print job and inputs the print job to an image forming apparatus, and obtaining an appropriately corrected print result.

According to an aspect of the present invention, an image forming system in which an image forming apparatus and an image processing apparatus configured to perform image processing on a print job and input the print job to the image forming apparatus are connected to each other. The image forming apparatus includes a first calibration execution unit configured to execute first calibration a notification unit configured to perform notification of an execution instruction for second calibration to the image processing apparatus based on a result of the first calibration, a first storage unit configured to store time information relating to the notification performed by the notification unit, and a response unit configured to transmit the time information, stored in the first storage unit, to the image processing apparatus, in response to a request from the image processing apparatus, and the image processing apparatus includes a second calibration execution unit configured to execute second calibration, a warning unit configured to perform a warning to prompt execution of the second calibration when the execution instruction for the second calibration notified from the image forming apparatus is received, an acquisition unit configured to acquire the time information from the image forming apparatus, a second storage unit configured to store the time information acquired by the acquisition unit, and a control unit configured to cause the warning unit to perform the warning, when the time information acquired by the acquisition unit indicates a date and time later than a date and time indicated by previously acquired time information that has been stored in the second storage unit.

Further features of the present invention will become apparent from the following description of exemplary embodiments with reference to the attached drawings.

BRIEF DESCRIPTION OF THE DRAWINGS

FIG. 13 is a flowchart illustrating another example of retransmission processing executed by a retransmission processing unit according to the second exemplary embodiment.

DESCRIPTION OF THE EMBODIMENTS

Exemplary embodiments of the present invention are described below with reference to the drawings.

<Overall Configuration of Image Forming System>

Figure 1:
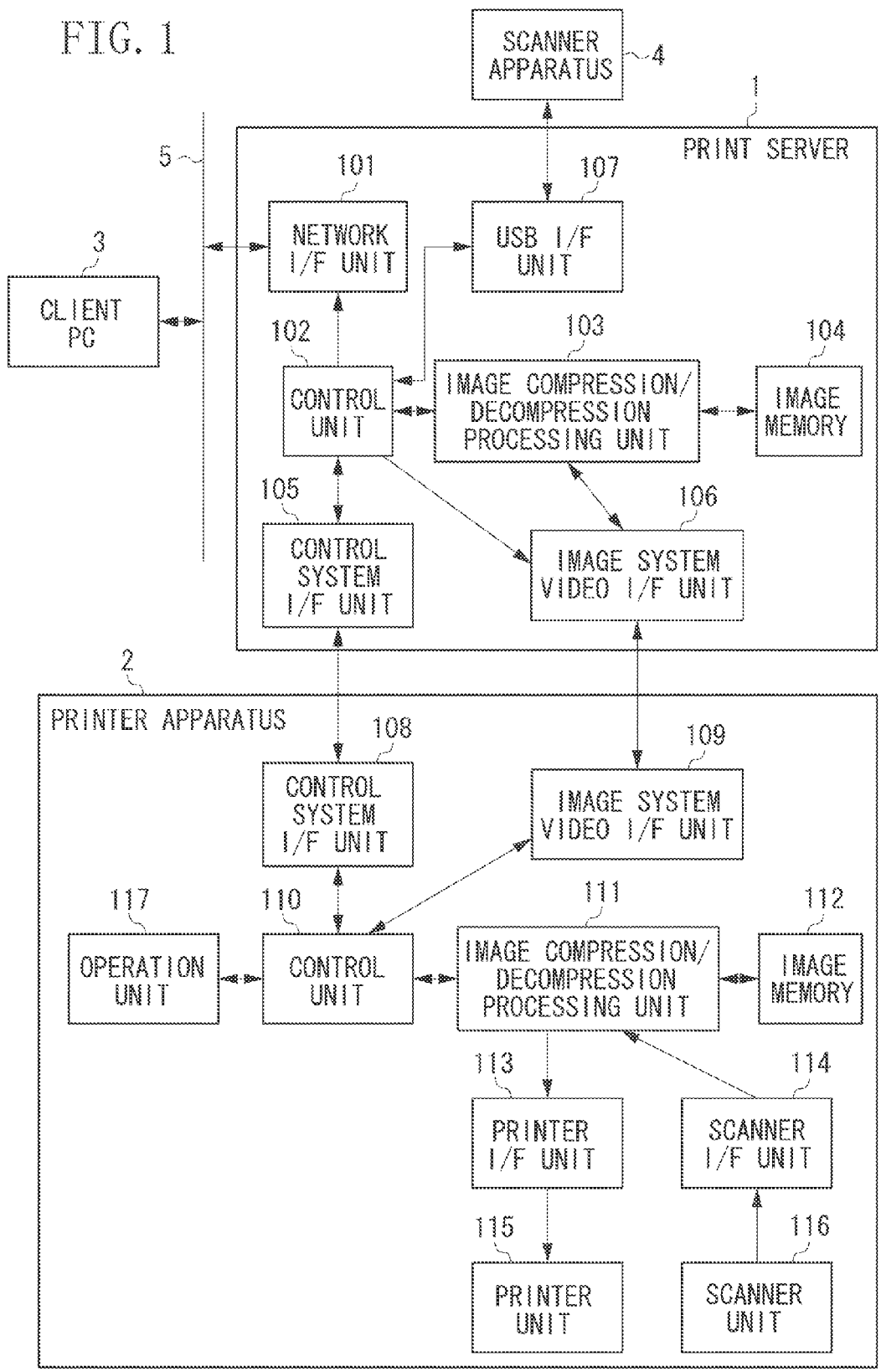
FIG. 1 is a block diagram illustrating an example of a configuration of an image forming system according to an exemplary embodiment of the present invention.

FIG. 1 is a block diagram illustrating an example of a configuration of an image forming system according to a first exemplary embodiment of the present invention.

As illustrated in FIG. 1, the image forming system according to the present exemplary embodiment includes a print server 1, a printer apparatus 2 directly connected to the print server 1 through a dedicated interface (I/F) unit, and a client personal computer (PC) 3 connected to the print server 1 through a network 5. An external scanner apparatus 4 may be connected to the print server 1 according to the present exemplary embodiment through a dedicated I/F unit such as a universal serial bus (USB) I/F unit 107.

The client PC 3 includes an input unit (not illustrated) such as a keyboard and a mouse to receive an instruction from a user, a display unit (not illustrated) such as a display, and a PC controller (not illustrated) that executes and controls general processing. Generally, a printer management application provided by the print server 1 is installed in the client PC 3. Thus, the user can input a print job and execute various settings through the printer management application.

<Configuration of Print Server>

The print server 1 is an external image processing apparatus (also referred to as an image processing controller and the like) connected to the printer apparatus 2. As illustrated in FIG. 1, the print server 1 includes a network I/F unit 101, a control unit 102, an image compression/decompression processing unit 103, an image memory 104, a control system I/F unit 105, and an image system video I/F unit 106. The print server 1 may further include an external interface such as the USB I/F unit 107.

The network I/F unit 101 controls communications with the external client PC 3 connected through the network 5. The control unit 102 includes a central processing unit (CPU), a hard disk drive (HDD), a memory, and the like (not illustrated). The control unit 102 performs analysis on the input print job, processing for converting print data into image data, gradation correction processing in the print server 1 described below, and other processing. The control unit 102 transmits information, required for a print control in the printer apparatus 2, to the printer apparatus 2 through the control system I/F unit 105. The control unit 102 sequentially transmits the converted image data to the image compression/decompression processing unit 103. The control unit 102 controls calibration processing of updating an LUT for the gradation correction processing.

The image compression/decompression processing unit 103 compresses the image data converted by the control unit 102 as required, and stores the image data in the image memory 104. The image compression/decompression processing unit 103 decompresses the image data stored in the image memory 104, and transmits the image data to the printer apparatus 2 through the image system video I/F unit 106.

The image memory 104 is a memory for storing the image data. The control system I/F unit 105 is an interface for transmitting and receiving the control information to and from the printer apparatus 2. The image system video I/F unit 106 is an interface for transmitting the image data to the printer apparatus 2. The USB I/F unit 107 is an interface for connecting an external apparatus such as the scanner apparatus 4 to the print server 1.

The print server 1 operates by switching at least between a normal power mode and a low power mode consuming less power than the normal power mode.

<Configuration of Printer Apparatus>

The printer apparatus 2 is an image forming apparatus connected to the print server 1. The printer apparatus 2 includes a control system I/F unit 108, an image system video I/F unit 109, a control unit 110, an image compression/decompression processing unit 111, an image memory 112, a printer I/F unit 113, a scanner I/F unit 114, a printer unit 115, a scanner unit 116, and an operation unit 117.

The control system I/F unit 108 is an interface for transmitting and receiving control information relating to the print job to and from the control system I/F unit 105 of the print server 1. The image system video I/F unit 109 is an interface for receiving the image data from the image system video I/F unit 106 of the print server 1.

The control unit 110 includes a CPU, an HDD, a memory, and the like (not illustrated). The control unit 110 receives data from the control system I/F unit 108 and the image system video I/F unit 109, and performs processing of converting the received data into data that can be output from the printer unit 115 and other processing. The control unit 110 processes the image data transmitted from the image system video I/F unit 109 based on the control information transmitted from the control system I/F unit 108 and setting information stored in the printer apparatus 2. The control unit 110 transmits the resultant image data to the image compression/decompression processing unit 111. The control unit 110 performs the gradation correction processing described below. The control unit 110 controls execution of calibration processing in the printer apparatus 2 to achieve target print characteristics as described below.

The image compression/decompression processing unit 111 compresses the image data transmitted by the control unit 110 as required, and stores the image data in the image memory 112. The image compression/decompression processing unit 111 decompresses the image data stored in the image memory 112, and transmits the image data to the printer I/F unit 113. The image memory 112 is a memory for storing the image data.

The printer I/F unit 113 is connected to the printer unit 115 and is an interface for transmitting the image data to the printer unit 115. The scanner I/F unit 114 is connected to the scanner unit 116, and is an interface for transmitting scanned image data from the scanner unit 116 to the image compression/decompression processing unit 111. The printer unit 115 performs printing on a recording sheet based on the image data. The scanner unit 116 reads a document and feeds the image data.

The operation unit 117 includes an input unit and a display unit (not illustrated), and is connected to the control unit 110. The input unit receives a print setting and an execution instruction for calibration from the user. The display unit presents information to the user. The control unit 110 executes required processing in accordance with information transmitted from the operation unit 117, and transmits the required information, to be presented to the user, to the operation unit 117.

The printer apparatus 2 operates by switching at least between the normal power mode and the low power mode consuming less power than the normal power mode.

<Configuration of Control Unit in Print Server>

Figure 2:
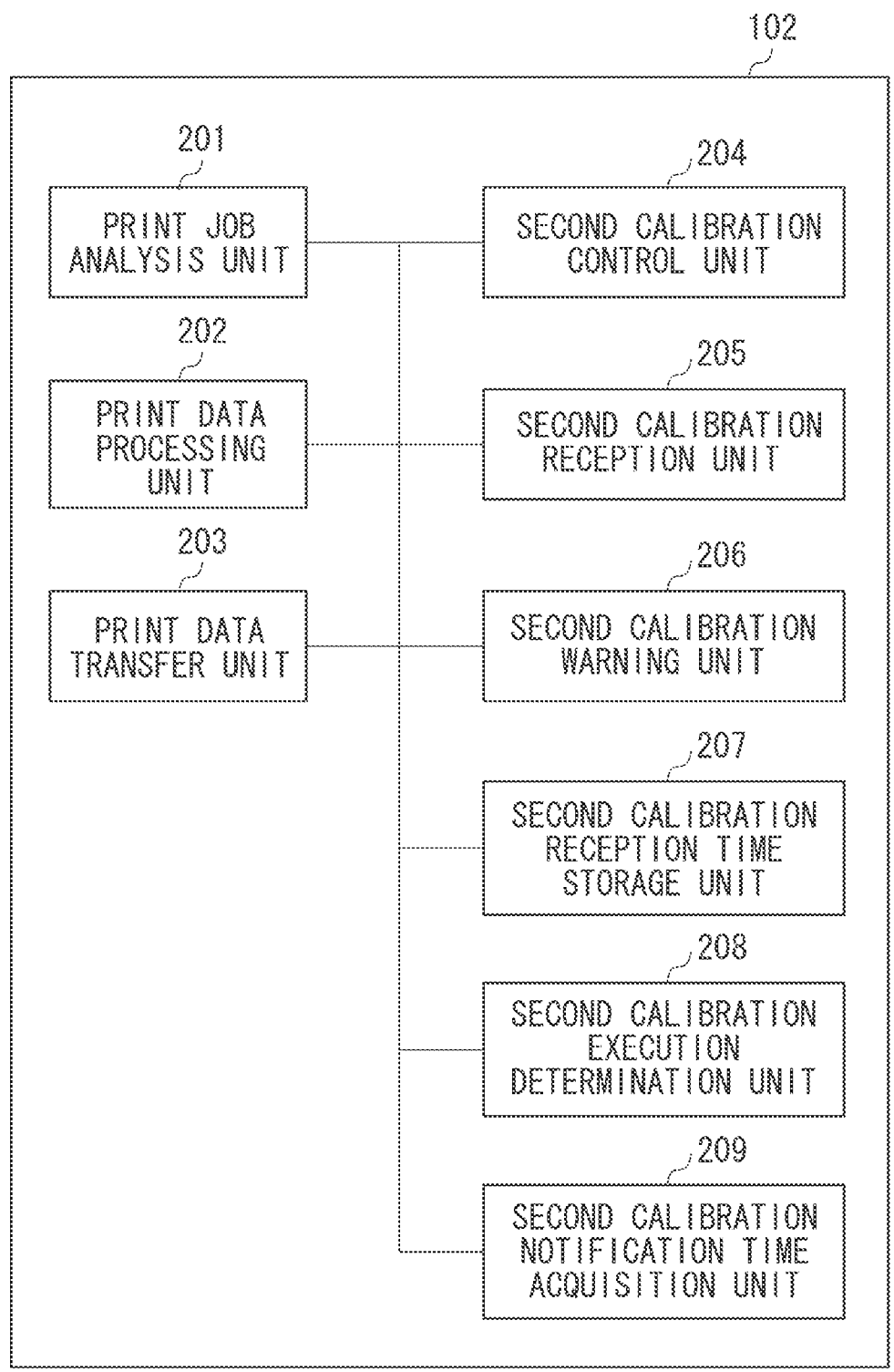
FIG. 2 is a block diagram illustrating an example of a software module configuration of a print server.

FIG. 2 is a block diagram illustrating an example of a software module configuration of the control unit 102 of the print server 1. The software module of the control unit 102 illustrated in FIG. 2 is implemented by the CPU of the control unit 102 through loading a program stored in the HDD and the like onto the memory, and executing the program, as required.

The software module of the control unit 102 includes a print job analysis unit 201, a print data processing unit 202, a print data transfer unit 203, a second calibration control unit 204, and a second calibration reception unit 205. The software module of the control unit 102 further includes a second calibration warning unit 206, a second calibration reception time storage unit 207, a second calibration execution determination unit 208, and a second calibration notification time acquisition unit 209, which are described below in detail.

The print job analysis unit 201 receives a print instruction, issued by the user from the client PC 3, through the network I/F unit 101. The print job analysis unit 201 analyzes the print job to read print setting information in the print job. The read print setting information herein mainly indicates a setting relating to information on a paper sheet used for the printing, a setting relating to an image function such as image processing and a print profile for achieving a user preferred output, information relating to print finishing processing, and the like.

The print data processing unit 202 executes processing on print data required in the print server 1, in accordance with the settings read out by the print job analysis unit 201. For example, the print data processing unit 202 executes the gradation correction processing by using the gradation correction LUT generated by the second calibration control unit 204 as described below.

The print data transfer unit 203 transfers to the printer apparatus 2, the print job including the print data that has been processed by the print data processing unit 202. The image data is transmitted to the printer apparatus 2 through the image compression/decompression processing unit 103, the image memory 104, and the image system video I/F unit 106. The control information for the printing process is transmitted to the printer apparatus 2 through the control system I/F unit 105.

The second calibration control unit 204 controls execution of calibration processing (second calibration processing) in the print server 1 to generate the gradation correction LUT. The execution of the second calibration will be described below in detail.

The second calibration reception unit 205 receives a notification indicating that the second calibration needs to be executed, from the printer apparatus 2. The second calibration warning unit 206 performs a warning to prompt the user to execute the second calibration, when the second calibration reception unit 205 receives the notification. Such processing will be described below in detail.

The second calibration reception time storage unit 207 stores time information indicating a date and time when the second calibration reception unit 205 has received the notification indicating that the second calibration needs to be executed, from the printer apparatus 2.

The second calibration notification time acquisition unit 209 acquires from the printer apparatus 2, time information indicating a date and time when the printer apparatus 2 has notified the print server 1 that the second calibration needs to be executed. When the time information acquired by the second calibration notification time acquisition unit 209 indicates a date and time later than that indicated by previously acquired time information that has been stored in the second calibration reception time storage unit 207, the time information thus acquired is stored in the second calibration reception time storage unit 207.

The second calibration execution determination unit 208 determines whether the second calibration processing needs to be executed, based on the time information acquired by the second calibration notification time acquisition unit 209 and the time information stored in the second calibration reception time storage unit 207. When the second calibration execution determination unit 208 determines that the second calibration processing needs to be executed, the second calibration warning unit 206 performs the warning to prompt the user to initiate the second calibration. In this case, the time information acquired by the second calibration notification time acquisition unit 209 is stored in the second calibration reception time storage unit 207. This processing will be described below in detail.

<Configuration of Control Unit in Printer Apparatus>

Figure 3:
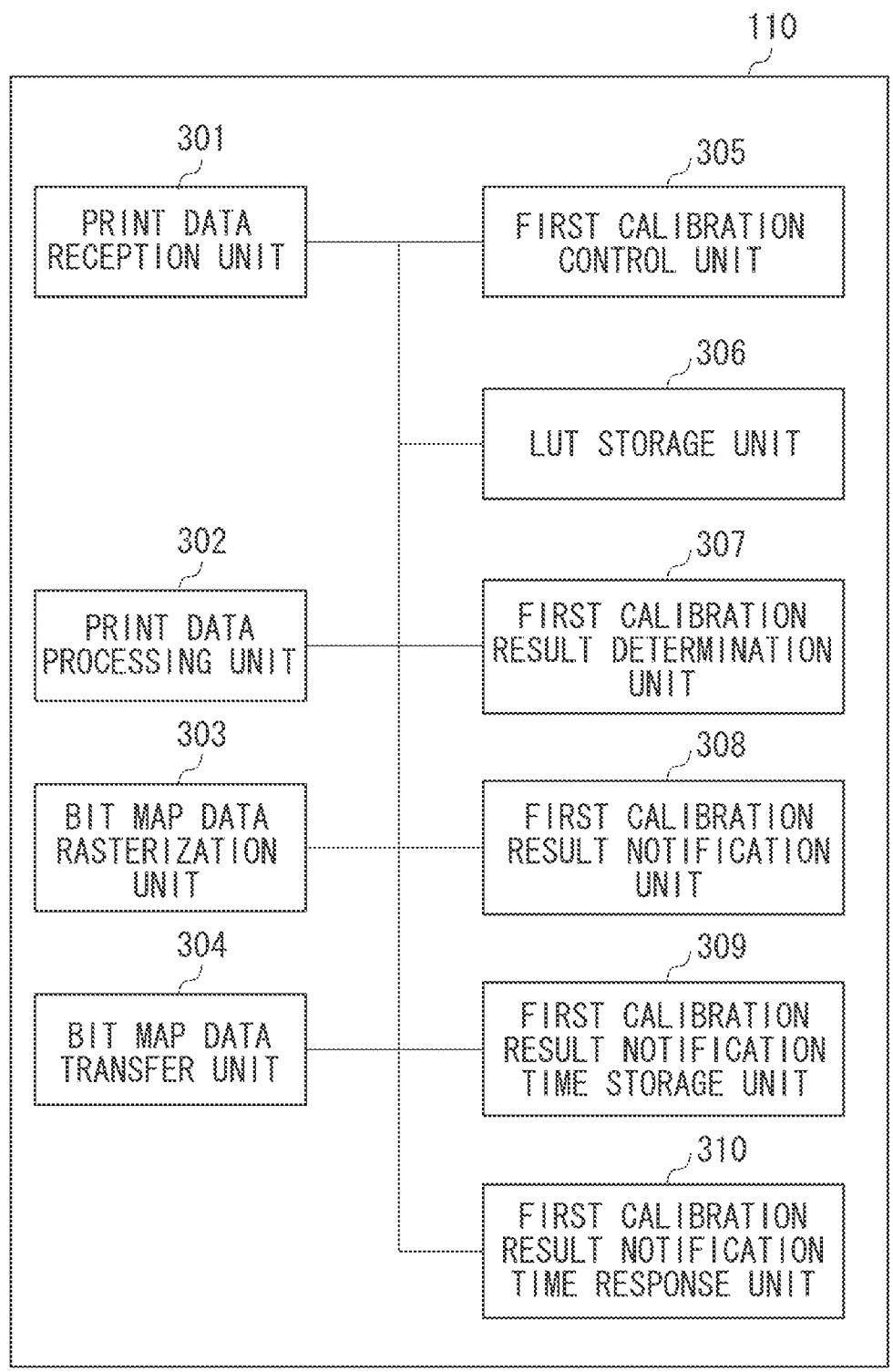
FIG. 3 is a block diagram illustrating an example of a software module configuration of a printer apparatus.

FIG. 3 is a block diagram illustrating an example of a software module configuration of the control unit 110 of the printer apparatus 2. The software module of the control unit 110 illustrated in FIG. 3 is implemented by the CPU of the control unit 110 through loading a program stored in the HDD and the like onto the memory and executing the program, as required.

The software module of the control unit 110 includes a print data reception unit 301, a print data processing unit 302, a bit map data rasterization unit 303, and a bit map data transfer unit 304. The software module of the control unit 110 further includes a first calibration control unit 305, an LUT storage unit 306, a first calibration result determination unit 307, and a first calibration result notification unit 308. The software module of the control unit 110 further includes a first calibration result notification time storage unit 309 and a first calibration result notification time response unit 310.

The print data reception unit 301 receives the print job including the print data from the print server 1 through the control system I/F unit 108 and the image system video I/F unit 109. The print data processing unit 302 performs a printing process required in the printer apparatus 2. For example, the print data processing unit 302 performs the gradation correction processing by using the gradation correction LUT generated by the first calibration control unit 305 as described below.

The bit map data rasterization unit 303 rasterizes the print data that has been processed by the print data processing unit 302 into bitmap data that can be printed by the printer unit 115. The bit map data transfer unit 304 transfers the bit map data rasterized by the bit map data rasterization unit 303 to the printer unit 115. The print data is transferred to the printer unit 115 through the image compression/decompression processing unit 111, the image memory 112, and the printer I/F unit 113, and thus the printing process is performed.

The first calibration control unit 305 controls execution of calibration processing (first calibration processing) in the printer apparatus 2, and generates the gradation correction LUT (first calibration execution result). The execution of the first calibration is described below in detail.

The LUT storage unit 306 stores the gradation correction LUT generated by the first calibration control unit 305. The gradation correction LUT is used for density gradation correction in the print data processing unit 302. The LUT storage unit 306 stores a reference gradation correction LUT used for first calibration result determination described below.

The first calibration result determination unit 307 compares the gradation correction LUT currently generated by the first calibration control unit 305 with the reference gradation correction LUT that has been stored in the LUT storage unit 306, and thus determines whether the second calibration needs to be executed. Here, the reference gradation correction LUT, stored in the LUT storage unit 306 and used for the determination, is the gradation correction LUT previously generated by the first calibration control unit 305. After the determination, the reference gradation correction LUT is updated by using the gradation correction LUT currently generated by the first calibration control unit 305. The reference gradation correction LUT thus updated is used for the next first calibration result determination. The first calibration result notification unit 308 notifies the print server 1 of the result of the determination by the first calibration result determination unit 307, as required. In the present exemplary embodiment, when the first calibration result determination unit 307 determines that the second calibration needs to be executed, a notification indicating that the second calibration needs to be executed is transmitted to the print server 1. Such processing will be described below in detail.

The first calibration result notification time storage unit 309 stores the time information indicating the date and time when the first calibration result notification unit 308 has notified the result, as result notification time. The time information stored as the result notification time is not limited to the date and time when the first calibration result notification unit 308 has notified the result. The time information may be a different type of time information relating to the notification by the first calibration result notification unit 308. For example, the time information may also be the time information (date and time when the first calibration corresponding to the notification has been executed) indicating the time and date when the first calibration control unit 305 has executed the first calibration processing. In the present exemplary embodiment, information indicating the time and date when the first calibration result notification unit 308 has notified the result is stored as the result notification time.

The first calibration result notification time response unit 310 receives from the print server 1, an acquisition request (request) for the result notification time stored in the first calibration result notification time storage unit 309. The first calibration result notification time response unit 310 transmits the time information to the print server 1 as a response.

<First Calibration Processing in Printer Apparatus>

The first calibration processing executed in the printer apparatus 2 is described below with reference to FIGS. 4 and 10.

Figure 4:
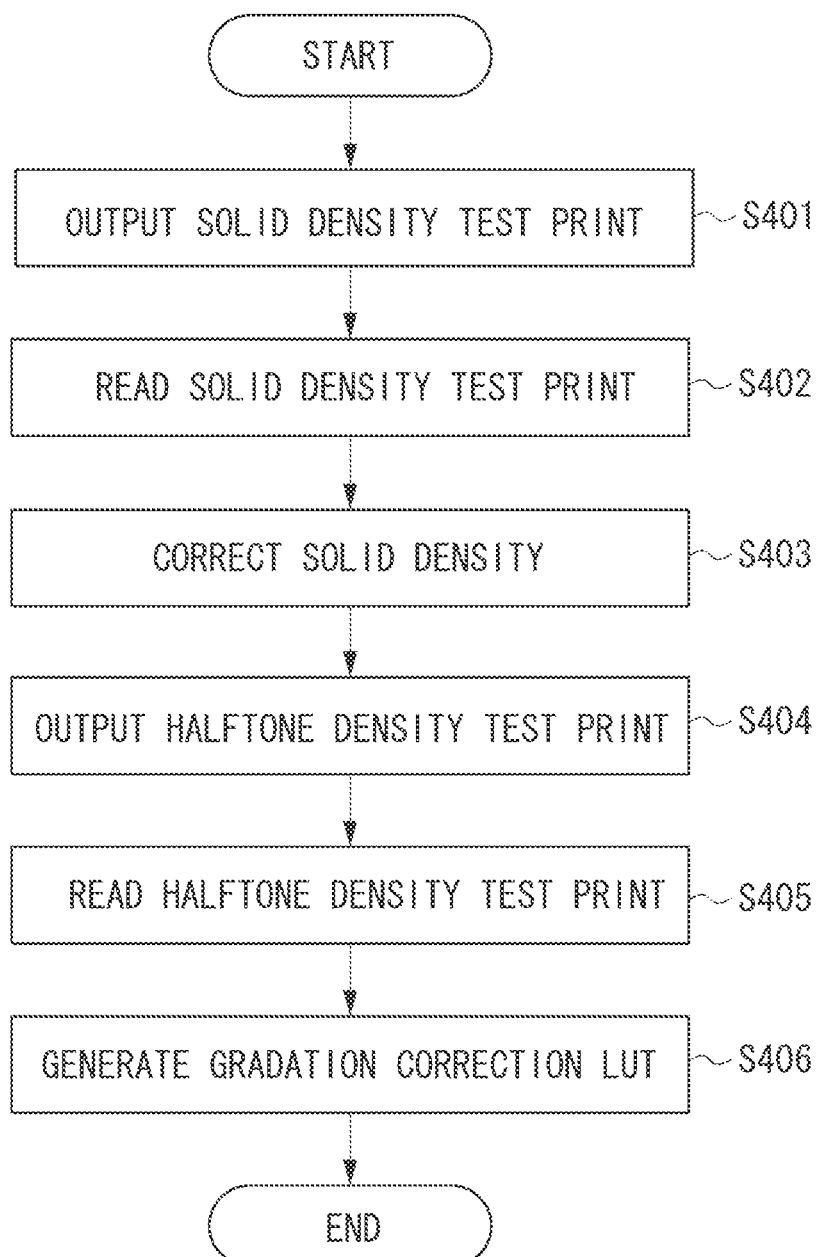
FIG. 4 is a flowchart illustrating an example of first calibration processing.

FIG. 4 is a flowchart illustrating an example of the first calibration processing. The first calibration processing is executed by the first calibration control unit 305 of the printer apparatus 2. Specifically, the first calibration processing is executed by the CPU of the control unit 110 through loading a program stored in the HDD and the like onto the memory and executing the program, as required. The first calibration processing is started when the user presses a calibration execution button (not illustrated) through the operation unit 117 of the printer apparatus 2.

In step S401, when the user presses a solid density test print output button (not illustrated) through the operation unit 117, the first calibration control unit 305 prints and outputs a solid density test print. More specifically, execution information (execution instruction) for the solid density test print is transmitted from the operation unit 117 to the control unit 110. Image data for the solid density test print is output from the printer unit 115 through the image compression/decompression processing unit 111 and the printer I/F unit 113. The image data for the solid density test print is, for example, in a form of a chart in which patches of the maximum density (255 in a case of 8 bit input data) of the toner of four colors (cyan, magenta, yellow, and black) used in the printer apparatus 2, are printed.

Then, in step S402, the first calibration control unit 305 causes the scanner unit 116, connected to the printer apparatus 2, to read the chart output in step S401 described above. When the user sets the output chart in the scanner unit 116 and presses a scan button (not illustrated) through the operation unit 117, the chart is optically read by the scanner unit 116 to be converted into digital data. The scanner I/F unit 114 transmits the data read by the scanner unit 116 to the control unit 110 through the image compression/decompression processing unit 111. Here, the device that performs the reading is not limited to the scanner unit 116. When a sensor that reads color data or density is installed in the printer apparatus 2, the sensor may be used as the device.

Then, in step S403, the first calibration control unit 305 acquires the maximum density (solid density) output from the current printer apparatus 2 from the test chart read by the scanner unit 116. Then, the first calibration control unit 305 performs correction to achieve a target solid density of the printer apparatus 2 stored in the printer apparatus 2 in advance. Any method such as, for example, adjusting power of a laser device as a part of the printer unit 115 may be used for the correction.

Then, in step S404, when the user presses a halftone density test print output button (not illustrated) through the operation unit 117, the first calibration control unit 305 outputs a halftone density test print. Execution information (execution instruction) for the halftone density test print is transmitted from the operation unit 117 to the control unit 110. Image data for the halftone density test print is output from the printer unit 115 through the image compression/decompression processing unit 111 and the printer I/F unit 113. The image data for the half tone density test print is, for example, a chart in which patches as arranged gradation data pieces of the toner of the four colors are printed.

Next, in step S405, the first calibration control unit 305 causes the scanner unit 116, connected to the printer apparatus 2, to read the chart output in step S404 described above. The reading is performed through the procedure similar to the processing for reading the solid density test print in step S402. The device that performs the reading is not limited to the scanner unit 116. When a sensor that reads color data or density is installed in the printer apparatus 2, the sensor may be used as the device.

Next, in step S406, the first calibration control unit 305 corrects density gradation characteristics of a printer engine read in step S405 described above, to achieve target density gradation characteristics of the printer engine, stored in the printer apparatus 2 in advance. As a method for the correction, an LUT is generated in such a manner that the output density corresponding to a digital input gradation value matches the target density gradation characteristic. The LUT generated herein is used for data processing for correcting the input gradation value in the print data processing unit 302 of the printer apparatus 2, when the print job is executed.

Figure 10A:
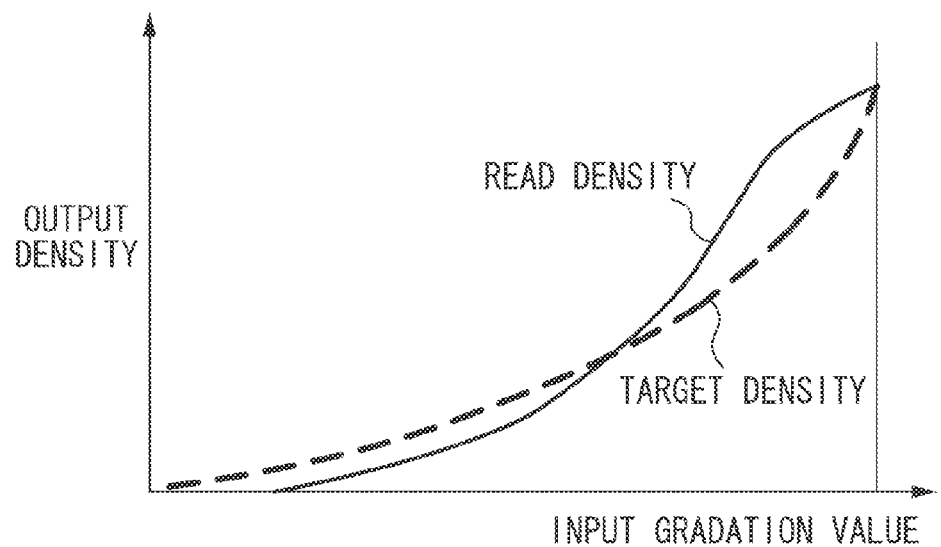
FIGS. 10A and 10B are graphs illustrating how density gradation correction data is generated.
Figure 10B:
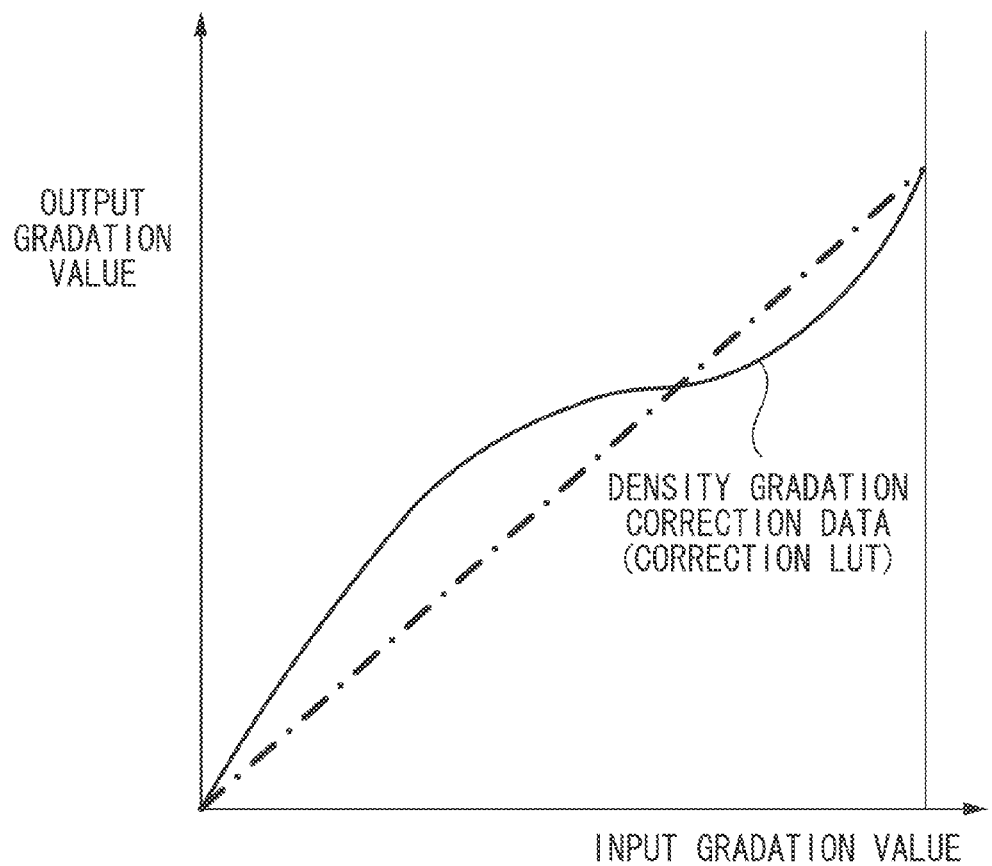

FIGS. 10A and 10B are diagrams illustrating how density gradation correction data is generated.

FIG. 10A illustrates an example of a relationship between density data read in step S405 in FIG. 4 and a target density as a target value, with respect to each input gradation value. A broken curved line in the figure represents target density gradation data indicating a relationship between the input gradation value and the target density as a target value corresponding to each gradation. A solid curved line in the same figure represents the density gradation characteristic of the printer engine at the point where the reading is performed in step S405 in FIG. 4.

FIG. 10B illustrates an example of a relationship between input and output signal values (input and output gradation values) calculated in step S406 in FIG. 4. The relationship represents the gradation correction LUT for correcting the gradation value so that the gradation value as a target value for the input gradation value is output. A dashed dotted straight line in FIG. 10B inclined by 45° is a reference line representing a case without gradation correction.

<Second Calibration Processing in Print Server>

Next, the second calibration processing executed in the print server 1 will be described with reference to FIG. 5.

Figure 5:
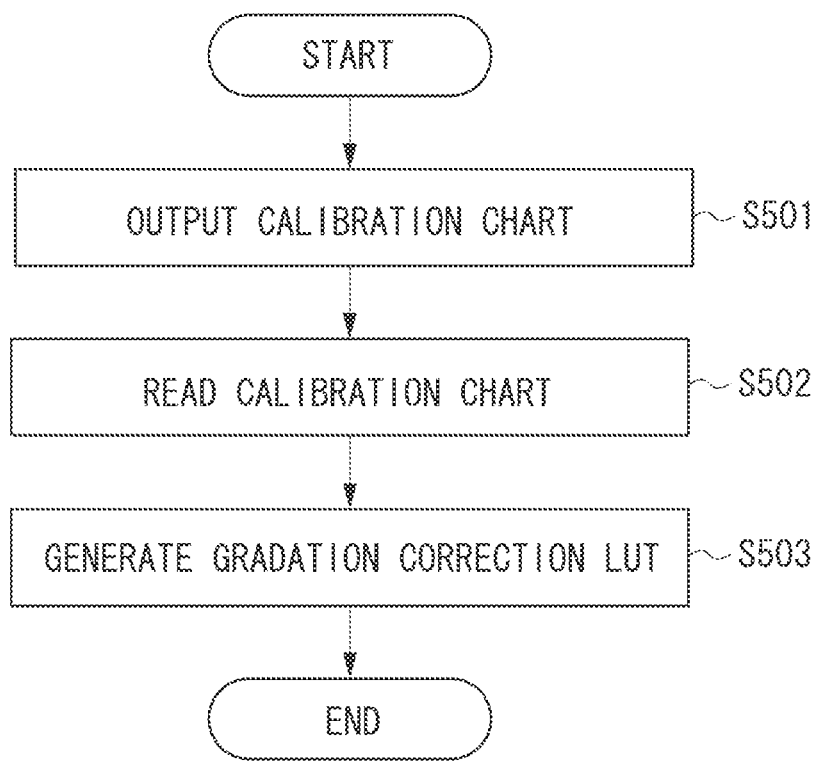
FIG. 5 is a flowchart illustrating an example of second calibration processing.

FIG. 5 is a flowchart illustrating an example of the second calibration processing. The second calibration processing is controlled by the second calibration control unit 204 of the print server 1, and is executed by using both the print server 1 and the printer apparatus 2. In other words, the second calibration processing is controlled by the CPU of the control unit 102 through loading a program stored in the HDD and the like onto the memory and executing the program, as required.

The execution of the second calibration is started when the user presses the calibration execution button through an operation unit (not illustrated) of the client PC 3. The calibration execution button is a calibration button 1102 in a warning screen 1101 illustrated in FIG. 11 and described below. The warning screen 1101 is displayed by the printer management application installed in the client PC 3 for example.

When the user presses the calibration execution button, in step S501, the second calibration control unit 204 transfers the print data of the calibration chart to the printer apparatus 2. Then, the chart is printed by the printer apparatus 2. More specifically, execution information (execution instruction) for outputting the calibration chart is transmitted to the control unit 102 from the client PC 3, having the calibration execution button pressed by the user, through the network I/F unit 101. Then, the image data of the calibration chart stored in the print server 1 is transmitted to the printer apparatus 2 through the image compression/decompression processing unit 103 and the image system video I/F unit 106. The printer apparatus 2 transmits the image data of the calibration chart, received by the control unit 110 through the image system video I/F unit 109, to the printer unit 115 through the image compression/decompression processing unit 111 and the printer I/F unit 113, whereby the chart is printed and output. For example, the calibration chart is a chart in which patches, in which gradation data pieces including the maximum density of the toner of the four colors are arranged, are printed.

Next, in step S502, the second calibration control unit 204 causes the scanner apparatus 4, connected to the print server 1, to read the calibration chart output in step S501 described above. For example, the scanner apparatus 4 used herein may be a colorimeter that can measure the density of a print product. The density data of the output calibration chart is read by the scanner apparatus 4 operated by the user and is transmitted to the control unit 102 through the USB I/F unit 107. Alternatively, the density data may be read by using the scanner unit 116 connected to the printer apparatus 2, and the density data thus read may be transmitted to the print server 1. In this case, the user sets the calibration chart in the scanner unit 116 of the printer apparatus 2, and presses the scan button through the operation unit 117. Then, the chart is optically read by the scanner unit 116 to be converted into digital data. The data is then transmitted to the control unit 110 through the scanner I/F unit 114 and the image compression/decompression processing unit 111, and is then transmitted to the print server 1 through the control system I/F unit 108. In the print server 1, the data is transmitted to the control unit 102 through the control system I/F unit 105.

In step S503, the second calibration control unit 204 corrects the density gradation characteristic of the printer engine read in step S502 described above to achieve the target density gradation characteristic of the print server 1 stored in the print server 1 in advance. As a method for the correction, the LUT is generated in such a manner that the output density corresponding to the digital input gradation value matches the target density gradation characteristic. The LUT generated herein is used for data processing for correcting the input gradation value in the print data processing unit 202 of the print server 1, when the print job is executed.

Now, the difference between the first calibration executed in the printer apparatus 2 and the second calibration executed in the print server 1 will be described.

The first calibration and the second calibration are executed for the same purpose. More specifically, the current printer engine characteristics are detected and the correction is performed to achieve the target output to maintain a constant state of the output print product. The difference lies in the gradation data as a target and a prior condition.

The first calibration is calibration executed in the printer apparatus 2. Each manufacturer of the printer engine defines maximum density and gradation target data of a target engine based on a design concept of the manufacturer. For example, generally known targets include gradation in which the density linearly changes and gradation in which the brightness linearly changes. The correction in the first calibration is applied to any processing for the print job involving printing and outputting performed by the printer apparatus 2 such as printing through the print server 1, printing through a printer driver not involving the print server 1, copying, and faxing.

The second calibration is calibration executed in the print server 1. The second calibration is different from the first calibration in that the maximum density and the target gradation data are defined by each manufacture of the print server 1, based on the design concept of the manufacturer. The correction in the second calibration is applied only to the print job from the print server 1. Therefore, the target of the second calibration needs not to be the same as the target of the first calibration.

Here, the following point is important. Specifically, for the print job from the print server 1, the correction in the second calibration is first performed when the print data is processed in the print server 1. Then, the data is transferred to the printer apparatus 2, and the correction in the first calibration is further performed when the print data is processed in the printer apparatus 2.

In step S501 in FIG. 5, the calibration chart corrected in the first calibration is output. Thus, as a prior condition for the correction in the second calibration to be executed, an engine state, including the result of the correction in the first calibration, needs to be kept constant. In other words, the accuracy of the correction in the second calibration is degraded despite the correction in the second calibration having just been executed, when the first calibration is executed after the correction in the second calibration so that the engine characteristics are changed.

Thus, the printer apparatus 2 determines whether the second calibration needs to be executed based on the result of the first calibration. Upon determining that the second calibration needs to be executed, the printer apparatus 2 notifies the print server 1 that the second calibration needs to be executed. The print server 1 that has received the notification displays warning prompting the execution of the second calibration.

The print server 1 and the printer apparatus 2 each independently have a power source, and thus can be independently turned OFF, restarted, or transition or recover to or from the low power mode (also referred to as a power-saving mode or a sleep mode). The print server 1 that has been turned OFF cannot receive the notification from the printer apparatus 2. A case is considered where the print server 1 is in a low power mode of a certain kind (what is known as the sleep mode in a general personal computer). In this case, the print server 1 should be in such a low power mode because the print server 1 is not being used. Thus, generally, a control is performed to maintain the low power mode unless otherwise required.

When the print server 1 is in the low power mode, the second calibration processing needs not to be immediately executed even when the first calibration processing is executed in the printer apparatus 2. Thus, the print server 1 performs a control so that the notification from the printer apparatus 2 is ignored. Thus, in a case where the print server 1 cannot receive or ignores the notification from the printer apparatus 2, there is a problem that the print server 1 cannot recognize that the second calibration processing needs to be executed.

To solve the problem, a mechanism is established in which the print server 1 determines whether the first calibration has been executed. Notification and warning processing according to the present exemplary embodiment is described below with reference to FIGS. 6, 7, and 11.

<First Calibration Result Determination and Result Notification>

Figure 6:
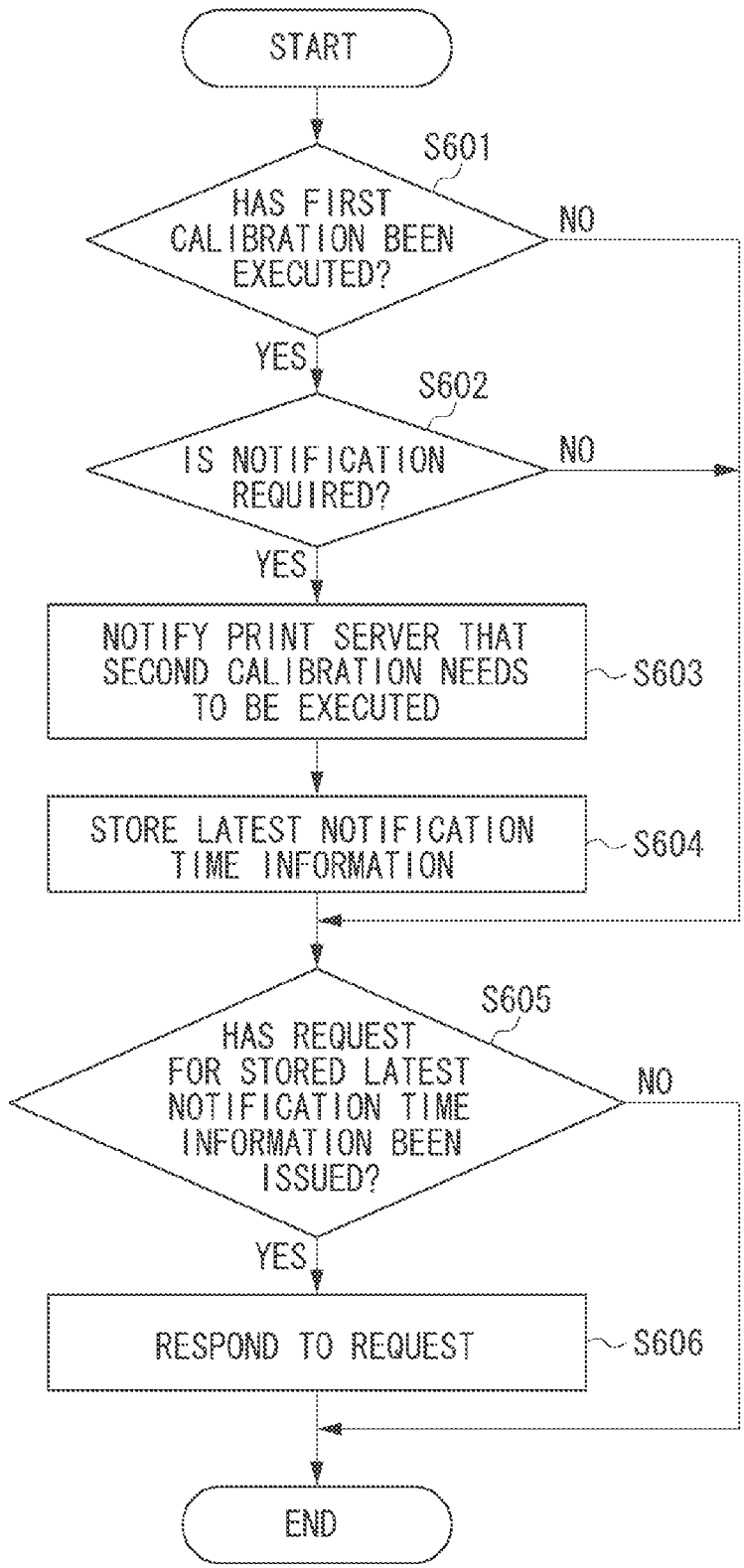
FIG. 6 is a flowchart illustrating an example of first calibration result determination processing, result notification processing, and notification time inquiry response processing.

FIG. 6 is a flowchart illustrating an example of first calibration result determination processing, result notification processing, and notification time inquiry response processing. The processing in this flowchart is executed by the CPU of the control unit 110 through loading a program stored in the HDD and the like onto the memory and executing the program, as required. The control unit 110 repeatedly executes the processing in the flowchart.

First, in step S601, the control unit 110 determines whether the first calibration has been executed in the printer apparatus 2. When the control unit 110 determines that the first calibration has not been executed (No in step S601), the processing proceeds to step S605. When the control unit 110 determines that the first calibration has been executed (Yes in step S601), the processing proceeds to step S602.

In step S602, the control unit 110 determines whether to notify the print server 1 that the second calibration needs to be executed. More specifically, whether the second calibration needs to be executed is determined based on the result of the first calibration.

The determination processing is executed through comparison between the gradation correction LUT currently generated by the first calibration control unit 305 and the reference gradation correction LUT stored in the LUT storage unit 306. When the control unit 301 determines that the second calibration needs to be executed, the LUT storage unit 306 stores the gradation correction LUT generated by the first calibration control unit 305, as the reference gradation correction LUT to be used in the next first calibration result determination. The content of the determination processing, which is executed by the first calibration result determination unit 307, is known and thus will not be described.

When the control unit 110 determines that the print server 1 does not need to be notified that the second calibration needs to be executed (No in step S602), the processing proceeds to step S605. When the control unit 110 determines that the print server 1 needs to be notified that the second calibration needs to be executed (Yes in step S602), the processing proceeds to step S603.

In step S603, the control unit 110 notifies the print server 1 that the second calibration needs to be executed. This processing is executed by the first calibration result notification unit 308 of the printer apparatus 2, and the notified information is transmitted to the control unit 102 of the print server 1 from the control unit 110 of the printer apparatus 2 through the control system I/F units 108 and 105.

Then, in step S604, the control unit 110 stores the time information, indicating the date and time when the notification in step S603 described above is performed, in the memory (not illustrated) of the control unit 110 of the printer apparatus 2, as latest notification time information. This processing is executed by the first calibration result notification time storage unit 309 of the printer apparatus 2.

Then, in step S605, the control unit 110 determines whether an inquiry for the latest notification time information, stored in step S604 described above, is received from the print server 1. When the control unit 110 determines that the request for the latest notification time information is not received (No in step S605), the processing in this flowchart is terminated. When the control unit 110 determines that the request for the latest notification time information is received (Yes in step S605), the processing proceeds to step S606. The inquiry for the latest notification time information is transmitted to the control unit 110 of the printer apparatus 2 from the control unit 102 of the print server 1 through the control system I/F units 108 and 105, and then is received by the first calibration result notification time response unit 310 of the printer apparatus 2.

In step S606, the control unit 110 responds to the inquiry for the latest notification time information. The first calibration result notification time response unit 310 of the printer apparatus 2 performs the response. The latest notification time information as the response is transmitted to the control unit 102 of the print server 1 from the control unit 110 of the printer apparatus 2, through the control system I/F units 108 and 105.

<Warning to Prompt Execution of Second Calibration>

Figure 7:
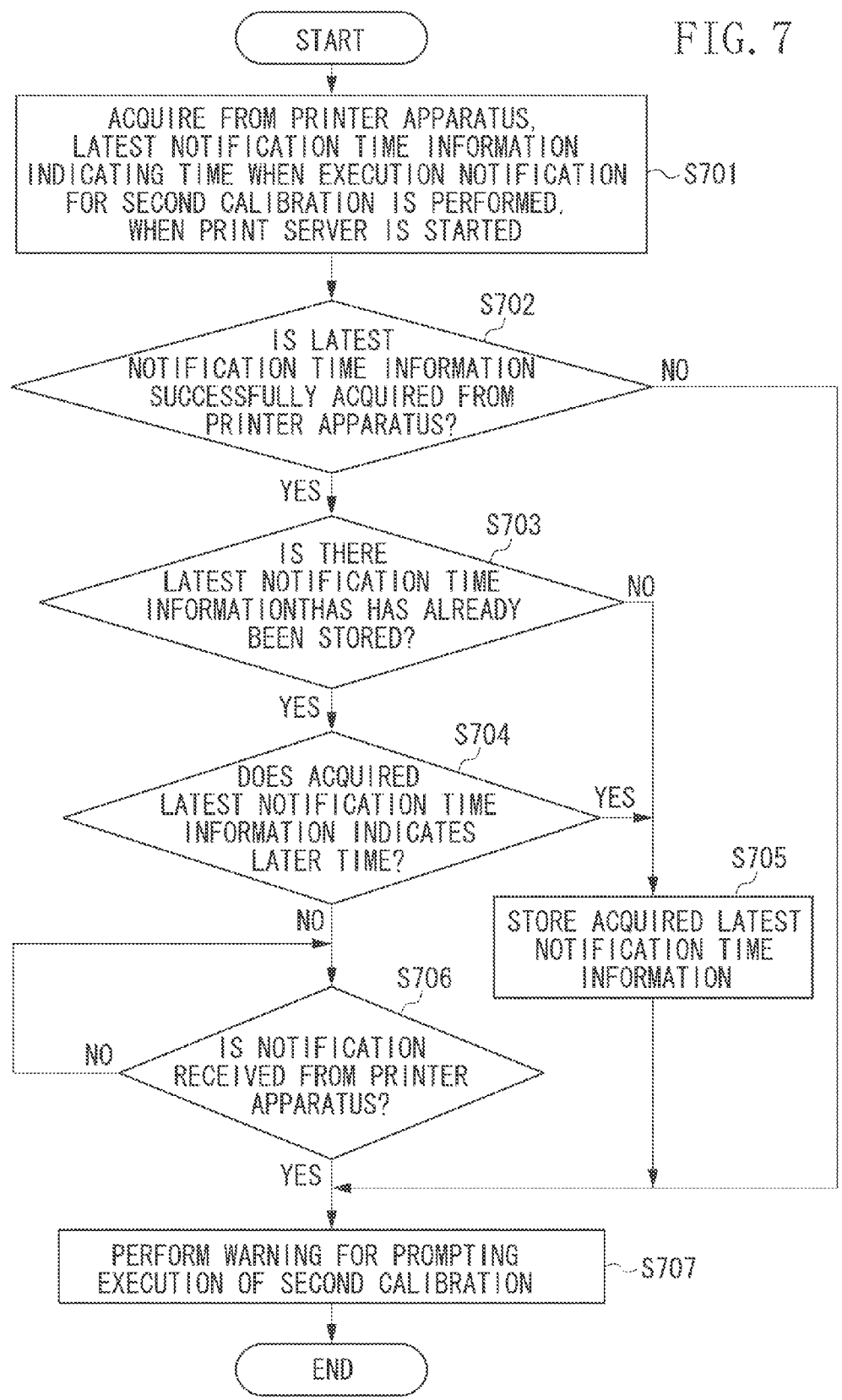
FIG. 7 is a flowchart illustrating an example of processing for acquiring latest notification time information from the printer apparatus when the print server is started and processing of performing a warning to prompt execution of the second calibration.

FIG. 7 is a flowchart illustrating an example of processing for acquiring the latest notification time information from the printer apparatus 2 executed at the time when the print server 1 is started, and processing of performing warning to prompt the execution of the second calibration in this flowchart is executed by the CPU of the control unit 102 through loading a program stored in the HDD and the like onto the memory and executing the program, as required. The processing in this flowchart is executed at the time when the print server 1 is started. The time when the print server 1 is started is not limited to a case where the print server 1 is started by being powered on or restarted. The time when the print server 1 is started includes all cases where the print server 1 recovers to a state capable of receiving the notification from a state incapable of receiving the notification from the printer apparatus 2 (step S603 in FIG. 6), such as a case where the print server 1 recovers from the low power mode.

First, in step S701, the control unit 102 acquires the latest notification time information (latest execution notification time for the second calibration processing) from the printer apparatus 2, at the time when the print server 1 is started. This processing is executed by the second calibration notification time acquisition unit 209 of the control unit 102 of the print server 1. The issued acquisition request is transmitted to the control unit 110 of the printer apparatus 2 from the control unit 102 of the print server 1 through the control system I/F units 108 and 105.

Next, in step S702, the control unit 102 determines whether the latest notification time information has been successfully acquired from the printer apparatus 2. When the control unit 102 determines that the latest notification time information has not been successfully acquired (No in step S702), the processing proceeds to step S707. When the control unit 102 determines that the latest notification time information has been successfully acquired (Yes in step S702), the processing proceeds to step S703.

In step S703, the control unit 102 determines whether the latest notification time information has been stored in the HDD (not illustrated) of the control unit 102. When the control unit 102 determines that the latest notification time information has not been stored (No in step S703), the processing proceeds to step S705.

On the other hand, when the control unit 102 determines that the latest notification time information has been stored (Yes in step S703), the processing proceeds to step S704.

In step S704, the control unit 102 determines whether the latest notification time information currently acquired in step S701 indicates time later than that indicated by the latest notification time information that has been stored (date and time later than that indicated by the previously acquired time information that has been stored in the print server 1). When the control unit 102 determines that the acquired latest notification time information indicates the time later than that indicated by the latest notification time information that has been stored (Yes in step S704), the processing proceeds to step S705. The processing in each of steps S703 and S704 described above is executed by the second calibration execution determination unit 208 of the control unit 102 of the print server 1. The second calibration execution determination unit 208 determines that the second calibration needs to be executed when the result of the determination in step S703 described above is "No", or when the result of the determination in step S704 described above is "Yes".

In step S705, the control unit 102 stores the acquired latest notification time information. The processing is executed by the second calibration reception time storage unit 207 of the control unit 102 of the print server 1. The latest notification time information is stored in the HDD (not illustrated) of the control unit 102 of the print server 1 so as be stored even when the print server 1 is turned OFF. When the storage processing in step S705 described above is completed, the processing proceeds to step S707.

When the control unit 102 determines that the acquired latest notification time information does not indicate the time later than that indicated by the latest notification time information that has been stored (No in step S704), the processing proceeds to step S706.

In step S706, the control unit 102 determines whether the notification indicating that the second calibration needs to be executed is received. When the control unit 102 determines that the notification indicating that the second calibration needs to be executed is not received (No in step S706), the processing in step S706 is repeated. On the other hand, when the control unit 102 determines that the notification indicating that the second calibration needs to be executed is received (Yes in step S706), the processing proceeds to step S707. This processing is executed by the second calibration reception unit 205 of the control unit 102 of the print server 1.

Although not illustrated in FIG. 7, when the notification is received, the second calibration reception time storage unit 207 stores the reception time of the notification as the latest notification time information. A configuration may also be employed in which information indicating the notification time in the printer apparatus 2 is included in the notification, and the information indicating the notification time is stored as the latest notification time information.

The control unit 102 executes the processing in step S707 when the result of the determination in step S703 described above is "No", when the result of the determination in step S704 described above is "Yes", or when the result of the determination in step S706 described above is "Yes".

In step S707, the control unit 102 performs the warning to prompt the user to start the second calibration. This processing is executed by the second calibration warning unit 206 of the control unit 102 of the print server 1, so that the control unit 102 displays the warning screen 1101 illustrated in FIG. 11 on the display unit of the client PC 3 through the network I/F unit 101. For example, the printer management application installed in the client PC 3 is used for displaying the warning screen 1101.

Figure 11:
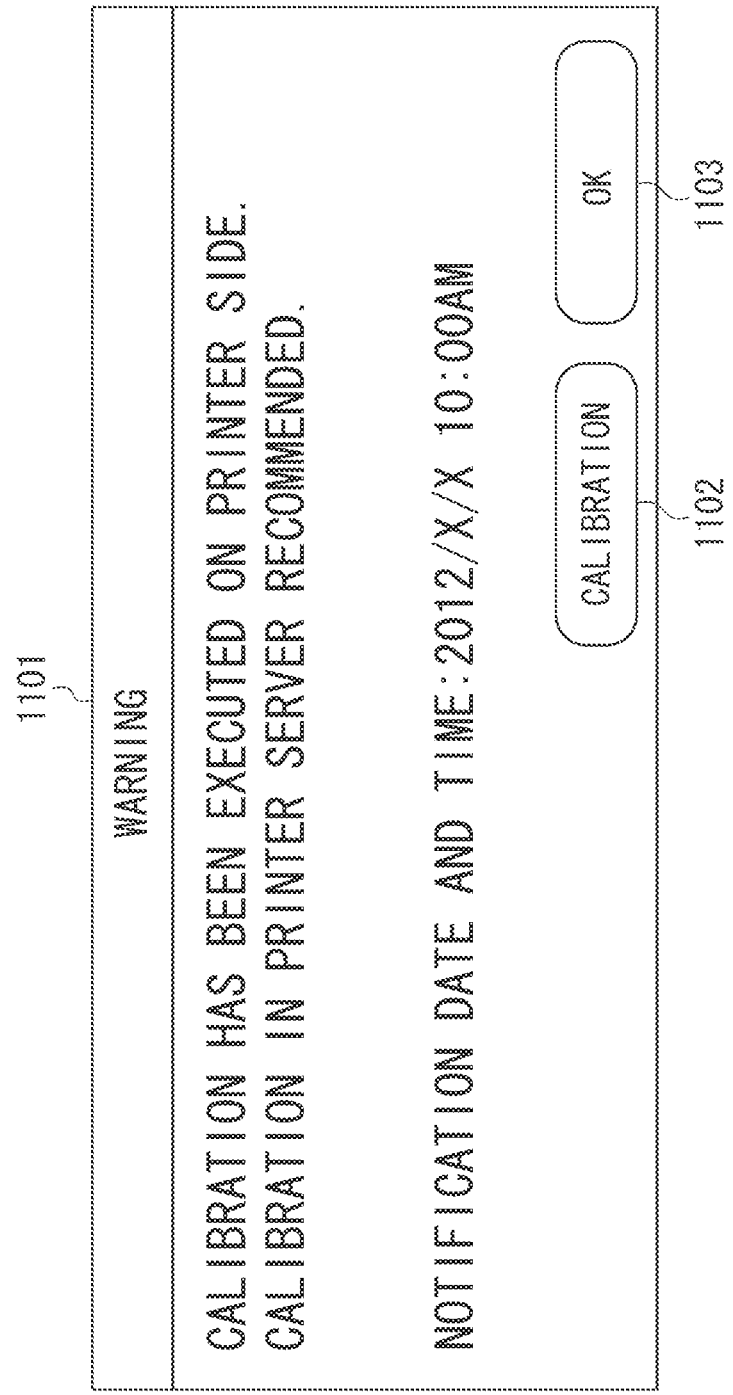
FIG. 11 is a diagram illustrating an example of a warning screen for prompting execution of the second calibration according to the second exemplary embodiment.

FIG. 11 is a diagram illustrating an example of the warning screen 1101 prompting the execution of the second calibration according to the present exemplary embodiment.

The second calibration warning unit 206 displays the warning screen 1101 on the display unit of the client PC 3. When the warning screen 1101 is displayed, the user can recognize that the first calibration has been executed and the characteristics of the printer apparatus 2 are changed, and thus can recognize that the second calibration needs to be executed in the print server 1.

When the user presses the calibration button 1102, the execution information (execution instruction) for outputting the calibration chart is transmitted to the control unit 102 from the client PC 3 displaying the warning screen 1101, through the network I/F unit 101. Thus, the second calibration control unit 204 executes the second calibration.

When the user feels that the second calibration needs not to be executed at the timing when the warning screen 1101 is displayed, the user may press an OK button 1103. The warning screen 1101 is closed when the OK button 1103 is pressed. A configuration may also be employed in which the client PC 3 displaying the warning screen 1101 transmits information indicating that the second calibration is not to be executed to the control unit 102 through the network I/F unit 101, when the OK button 1103 is pressed. The second calibration warning unit 206 may thus instruct the client PC 3 to close the displayed warning screen 1101.

A configuration may also be employed in which, when the user presses the OK button 1103, the second calibration warning unit 206 displays the warning screen 1101 again when a predetermined period of time elapses after the user has pressed the OK button 1103, to prompt the user to initiate the second calibration.

In the present exemplary embodiment, an example is described where the system does not proceed beyond displaying the warning screen 1101 by the second calibration warning unit 206, and the user makes the decision to actually execute the second calibration processing. This is because in the described second calibration processing, the user has to be involved in the operation of outputting and reading the calibration chart. When the calibration chart can be automatically read through a medium such as a line sensor connected to the apparatus and the second calibration can be executed without involving the user, the second calibration can be actually executed instead of displaying the warning. More specifically, step S707 may be a step of executing the second calibration.

In the present exemplary embodiment, the mechanism enabling the print server 1 to determine whether the first calibration has been executed is established through the above-described operations between the printer apparatus 2 and the print server 1. Thus, even in the state where the print server 1 cannot receive the notification from the printer apparatus 2 or performs a control so that the notification is ignored, at the time when the notification is performed by the printer apparatus 2, the user can be appropriately notified that the execution of the second calibration processing is required. The state, where the print server 1 cannot receive the notification from the printer apparatus 2 or performs the control so that the notification is ignored, is the case where the print server 1 is turned OFF or in the low power mode, for example.

Thus, even when the print server 1 fails to recognize the second calibration execution instruction from the printer apparatus 3, the second calibration can be executed later on when required. As a result, the risk that the appropriately corrected print result cannot be obtained due to the failure to execute the calibration can be reduced. In other words, calibration can be appropriately executed in an image processing apparatus that performs image processing on a print job and inputs the print job to an image forming apparatus. Thus, the appropriately corrected print result can be obtained.

In the configuration according to the first exemplary embodiment, the print server 1 determines whether the execution instruction for the second calibration processing has been issued, at the time when the print server 1 is started. In a second exemplary embodiment, having the same basic configuration as the first exemplary embodiment, an example is described where the printer apparatus 2 is provided with a mechanism for recognizing a power mode of the print server 1, and the problem is solved by retrying the notification. The example is described with reference to FIGS. 8, 9, and 12.

<First Calibration Result Determination and Result Notification>

Figure 12:
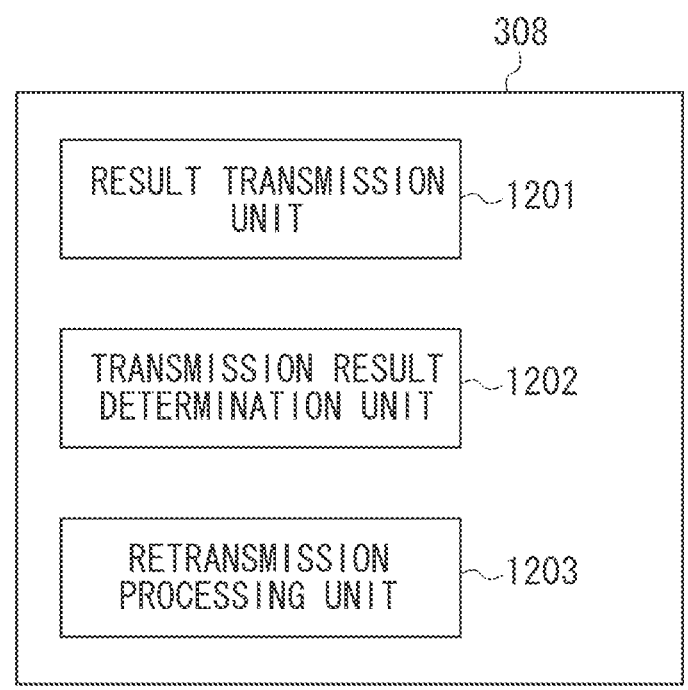
FIG. 12 is a diagram illustrating an example of a configuration of a first calibration result notification unit according to the second exemplary embodiment.

FIG. 12 is a block diagram illustrating an example of a configuration of the first calibration result notification unit 308 according to the second exemplary embodiment.

The first calibration result notification unit 308 according to the second exemplary embodiment includes a result transmission unit 1201, a transmission result determination unit 1202, and a retransmission processing unit 1203 that are described below in detail.

In the second exemplary embodiment, the software module of the control unit 110 of the printer apparatus 2 include neither of the first calibration result notification time storage unit 309 nor the first calibration result notification time response unit 310. In the second exemplary embodiment, the software module of the control unit 102 of the print server 1 include none of the second calibration reception time storage unit 207, the second calibration execution determination unit 208, and the second calibration notification time acquisition unit 209.

Figure 8:
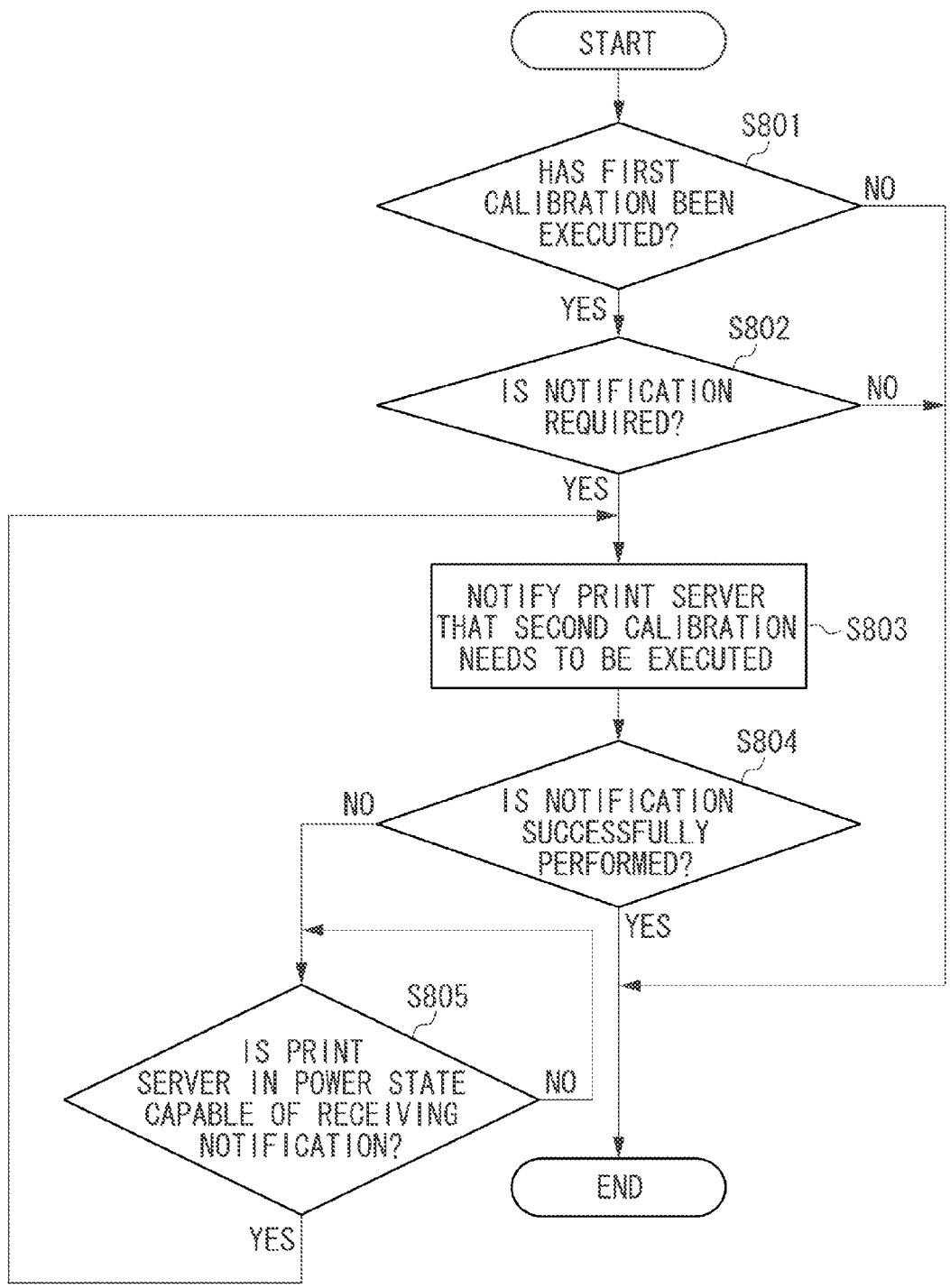
FIG. 8 is a flowchart illustrating an example of first calibration result determination processing and result notification processing executed by the printer apparatus according to a second exemplary embodiment.

FIG. 8 is a flowchart illustrating an example of first calibration result determination processing and result notification processing according to the second exemplary embodiment. The processing in this flowchart is executed by the CPU of the control unit 110 through loading a program stored in the HDD and the like onto the memory and executing the program, as required. The control unit 110 repeatedly executes the processing in this flowchart.

First, in step S801, the control unit 110 determines whether the first calibration has been executed in the printer apparatus 2. When the control unit 110 determines that the first calibration has not been executed (No in step S801), the processing in this flowchart is terminated. On the other hand, when the control unit 110 determines that the first calibration has been executed (Yes in step S801), the processing proceeds to step S802.

In step S802, the control unit 110 determines whether the print server 1 needs to be notified that the second calibration needs to be executed. More specifically, the control unit 110 determines whether the second calibration needs to be executed based on the result of the first calibration. This processing is similar to that performed in the first exemplary embodiment, and thus will not be described.

When the control unit 110 determines that the print server 1 does not need to be notified that the second calibration needs to be executed (No in step S802), the processing in the flowchart is terminated. On the other hand, when the control unit 110 determines that the print server 1 needs to be notified that the second calibration needs to be executed (Yes in step S802), the processing proceeds to step S803.

In step S803, the control unit 110 notifies the print server 1 that the second calibration needs to be executed. This processing is executed by the result transmission unit 1201 of the first calibration result notification unit 308. The details of the processing are similar to those of the first exemplary embodiment, and thus will not be described.

Then, in step S804, the control unit 110 determines whether the notification in step S803 has successfully ended (successful notification). When the control unit 110 determines that the notification has successfully ended (successful notification) (Yes in step S804), the processing in this flowchart is terminated. On the other hand, when the control unit 110 determines that the notification has not successfully ended (failed notification) (No in step S804), the processing proceeds to step S805. This processing is executed by the transmission result determination unit 1202 of the first calibration result notification unit 308. Here, for example, a protocol ensuring bidirectional transmission such as TCP/IP may be used for communications. Thus, by using such a protocol, whether a response from the print server 1 is obtained is determined, or by referring to information on a transmission result included in the response, a communication result is determined.

In step S805, the control unit 110 determines whether the print server 1 is in a power mode capable of receiving the notification, or in a power mode not capable of receiving the notification. This processing is executed by the retransmission processing unit 1203 of the first calibration result notification unit 308. When the control unit 110 determines that the print server 1 is in the power mode not capable of receiving the notification (No in step S805), the processing in step S805 described above is repeated. Thus, the control unit 110 monitors the power mode of the print server 1 until the printer server 1 transitions to the power mode capable of receiving the notification.

On the other hand, when the control unit 110 determines that the print server 1 is in the power mode capable of receiving the notification (Yes in step S805), the processing proceeds to step S803, so that a control is performed for retrying the notification. As described above, the printer apparatus 2 waits until the print server transitions to a state capable of receiving the notification, and performs the notification retransmission processing when the print server 1 transitions to the state. This processing is executed by the retransmission processing unit 1203 of the first calibration result notification unit 308. The retransmission processing for the print server 1 executed by the retransmission processing unit 1203 will be described below in detail.

<Warning for Prompting Execution of Second Calibration>

Figure 9:
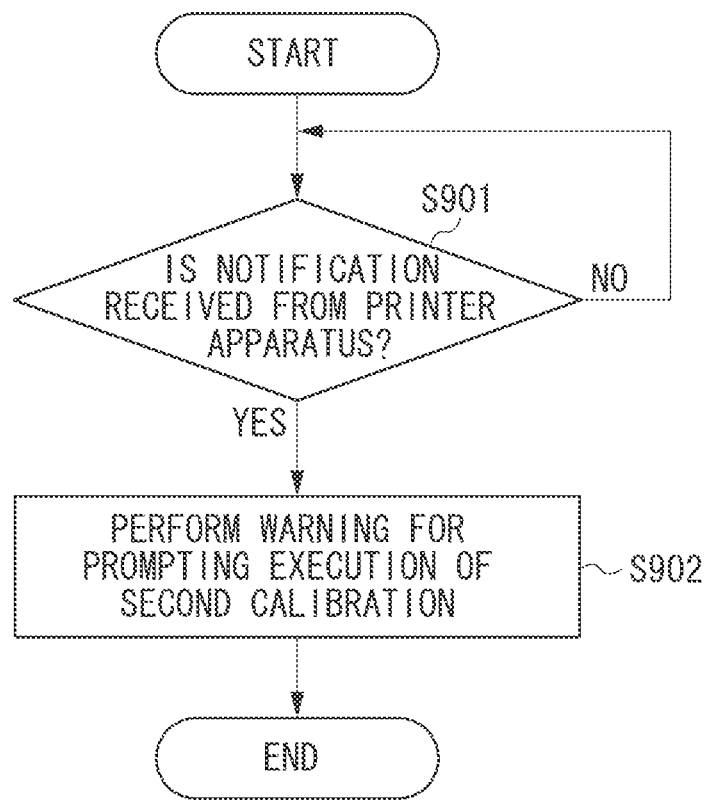
FIG. 9 is a flowchart illustrating an example of processing for performing a warning to prompt execution of the second calibration executed by the print server in the second exemplary embodiment.

FIG. 9 is a flowchart illustrating an example of processing for performing a warning for prompting execution of the second calibration according to the second exemplary embodiment. The processing in this flowchart is executed by the CPU of the control unit 102 of the print server 1 through loading a program stored in the HDD and the like onto the memory and executing the program, as required. The control unit 102 repeatedly executes the processing in this flowchart.

First, in step S901, the control unit 102 determines whether the notification indicating that the second calibration needs to be executed is received from the printer apparatus 2. When the control unit 102 determines that the notification indicating that the second calibration needs to be executed is not received (No in step S901), the processing in step S901 is repeated. When the control unit 102 determines that the notification indicating that the second calibration needs to be executed is received (Yes in step S901), the processing proceeds to step S902. This processing is executed by the second calibration reception unit 205 of the control unit 102 of the print server 1.

In step S902, the control unit 102 performs the warning to prompt the user to execute the second calibration. This processing is executed by the second calibration warning unit 206 of the control unit 102. Thus, the warning screen 1101 as illustrated in FIG. 11 is displayed on the display unit of the client PC 3 through the network I/F unit 101. For example, the printer management application installed in the client PC 3 is used for displaying the warning screen 1101.

<Retransmission Processing Executed by Retransmission Processing Unit>

Now, the retransmission processing for the print server 1 executed by the retransmission processing unit 1203 will be described.

The retransmission processing unit 1203 periodically acquires information on the power mode from the print server 1. For example, the information on the power mode may be installed in the print server 1 in a form of a management information base (MIB). The printer apparatus 2 may acquire the information from the print server 1 through a simple network management protocol (SNMP).

When the print server 1 is powered off or being restarted, even when the retransmission processing unit 1203 performs information acquisition request for information to the print server 1, the printer apparatus 2 cannot acquire the information. Also when the print server 1 is in the low power mode of a certain type, even when the retransmission processing unit 1203 issues an acquisition request for the information to the print server 1 as described above, the print server 1 performs a control so that the request is ignored. Thus, the print server 1 can be prevented from needlessly recovering from the low power mode. As described above, the retransmission processing unit 1203 determines that the print server 1 is not in the state capable of receiving the notification, when the print server 1 does not respond to the acquisition request. On the other hand, the retransmission processing unit 1203 determines that the print server 1 is in the state capable of receiving the notification, when the print server 1 responds to the acquisition request.

<Another Example of Retransmission Processing>

Another possible method of implementing the retransmission processing by the retransmission processing unit 1203 includes a method in which the print server 1 notifies the own state in advance. Processing executed by the retransmission processing unit 1203 in a case where this method is employed is described with reference to FIG. 13.

FIG. 13 is a flowchart illustrating another example of the retransmission processing executed by the retransmission processing unit 1203 according to the second exemplary embodiment. The processing in this flowchart is executed by the retransmission processing unit 1203, that is, the CPU of the control unit 110 through loading a program stored in the HDD and the like onto the memory and executing the program, as required.

Before executing this processing, when the print server 1 powered off or transitions to the low power mode, the print server 1 performs uncommunicable state notification to the printer apparatus 2. The print server 1, when it is powered on or recovered from the low power mode, performs communicable state notification to the printer apparatus 2.

First, in step S1301, the retransmission processing unit 1203 determines whether the print server 1 has issued the uncommunicable state notification. When the retransmission processing unit 1203 determines that the uncommunicable state notification has not been issued (No in step S1301), the processing proceeds to step S1304. On the other hand, when the retransmission processing unit 1203 determines that the uncommunicable state notification has been issued (Yes in step S1301), the processing proceeds to step S1302.

In step S1302, the retransmission processing unit 1203 determines that the print server 1 is in the uncommunicable state. In step S1303, the retransmission processing unit 1203 determines whether the communicable state notification has been issued by the print server 1. When the retransmission processing unit 1203 determines that the communicable state notification has not been issued by the print server 1 (No in step S1303), the processing in step S1303 is repeated.

On the other hand, when the retransmission processing unit 1203 determines that the communicable state notification has been issued (Yes in step S1303), the processing proceeds to step S1304. In step S1304, the retransmission processing unit 1203 determines that the print server 1 is in the communicable state, and the processing in this flowchart is terminated. Thus, the retransmission processing unit 1203 retries the notification indicating that the second calibration needs to be executed, to the print server 1.

Through the operations described above, the user can be appropriately notified that the second calibration processing needs to be executed even when the print server cannot receive the notification from the printer apparatus 2 or performs the control so that the notification is ignored. Thus, an effect that is similar to that obtained according to the first exemplary embodiment can be obtained. The content of the processing executed by the print server 1 according to the second exemplary embodiment is simpler than that in the first exemplary embodiment.

In a third exemplary embodiment, the printer apparatus 2 can transition to the low power modes at least including a first low power mode and a second low power mode. In the first low power mode, power supply to a fixing device (not illustrated) is maintained. In the second low power mode, the power supply to the fixing device is cut off. Thus, when the printer apparatus 2 recovers from the second low power mode, in which the power supply to the fixing device is stopped, to perform printing, the temperature of the fixing device needs to be readjusted. The density characteristic is changed by the readjustment, and thus the calibration needs to be executed again in the printer apparatus 2. Accordingly, when the printer apparatus 2 frequently transitions to the second low power mode, the calibration needs to be executed in the printer apparatus 2 each time the transition to the second low power mode occurs. As a result, the calibration in the print server 1 also needs to be executed frequently to maintain image quality.

In the present exemplary embodiment, the following configuration is employed to solve the problem described above.

In the print server 1, for example, an effective period of the second calibration (e.g., five hours) can be set through the client PC 3. The print server 1 stores the effective period in the HDD (not illustrated) of the control unit 102. The control unit 102 of the print server 1 notifies the printer apparatus 2 of information on the effective period, when the second calibration is executed.

When the information on the effective period of the second calibration is received from the print server 1, the control unit 110 of the printer apparatus 2 stores the effective period in the HDD (not illustrated) of the control unit 110. The control unit 110 controls the power mode of the printer apparatus 2 so that the printer apparatus 2 does not transition to the second low power mode during the effective period. Thus, the first calibration can be prevented from being executed in the printer apparatus 2 during the effective period of the second calibration. As a result, the print server 1 less frequently executes the second calibration during the effective period.

The control unit 110 of the printer apparatus 2 releases the restriction for transitioning to the second low power mode when the effective period expires. Thus, the power mode of the printer apparatus 2 is controlled so that the printer apparatus 2 transitions to the second low power mode as required. When the effective period of the second calibration expires, the print server 1 needs to execute the second calibration regardless of whether the first calibration has been executed.

With the configurations described above, in the image forming system in which the print server and the printer apparatus are connected to each other, the risk that the appropriately corrected print result cannot be obtained due to the failure to execute the calibration in the print server can be reduced.

Degradation of the image quality of the print result due to the failure to appropriately execute the calibration in the print server can be prevented according to the embodiments described above.

The structures and contents of various types of data are not limited to those described above, and various structures and contents may be employed in accordance with different types of uses and objects.

For example, the present invention, of which the embodiments have been described, may be implemented in a form of a system, an apparatus, a method, a program, a storage medium, or the like. More specifically, the present invention may be applied to a system including a plurality of devices or to an apparatus including a single device.

Further, the present invention includes all the combinations among the embodiments described above.

The present invention may be implemented by executing the following processing. Specifically, software (program) for implementing the functions of the embodiments described above may be supplied to a system or an apparatus through a network or various types of storage medium. A computer (a CPU, a micro processing unit (MPU), or the like) in the system or the apparatus may read and execute the program.

The present invention may be applied to a system including a plurality of devices or an apparatus including a single device.

The present invention is not limited to the embodiments described above, and can be modified in various ways (including organic combinations among the embodiments) based on the gist of the present invention. The scope of the present invention includes such modifications. Thus, the present invention includes all configurations obtained by combining the embodiments described above and the modifications.

In the present invention, calibration can be appropriately executed in an image processing apparatus that executes image processing on a print job and inputs the print job to an image forming apparatus. Thus, an appropriately corrected print result can be obtained. All things considered, degradation of image quality of the print result due to the failure to appropriately execute calibration in the image processing apparatus can be prevented.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-245762, filed Nov. 28, 2013, which is hereby incorporated by reference herein in its entirety.

What is claimed is:

1. An image forming system in which an image forming apparatus and an image processing apparatus configured to generate image data based on a print job and input the image data to the image forming apparatus are connected to each other,
    wherein the image forming apparatus includes:
    a first calibration execution unit configured to execute first calibration;
    a notification unit configured to perform notification of an execution instruction for second calibration to the image processing apparatus based on execution of the first calibration by the first calibration execution unit;
    a first storage unit configured to store time information relating to time at which the first calibration execution unit executes the first calibration; and
    a response unit configured to transmit the time information, stored in the first storage unit, to the image processing apparatus, in response to a request from the image processing apparatus, and
    wherein the image processing apparatus includes:
    a second calibration execution unit configured to execute second calibration;
    an acquisition unit configured to acquire the time information from the image forming apparatus;
    a second storage unit configured to store the time information acquired by the acquisition unit; and
    a warning unit configured to perform a warning to prompt execution of the second calibration, in a case where the time information acquired by the acquisition unit indicates a date and time later than a date and time indicated by previously acquired time information that has been stored in the second storage unit.

2. The image forming system according to claim 1, wherein the second calibration execution unit executes the second calibration, in a case where a user issues an execution instruction for the second calibration in response to the warning.

3. The image forming system according to claim 1, wherein the acquisition unit is configured to acquire the time information in a case where the image processing apparatus recovers to a state in which the notification can be received from the image forming apparatus, from a state in which the notification cannot be received from the image forming apparatus.

4. The image forming system according to claim 3,
    wherein the image processing apparatus is configured to operate by switching between at least a first power mode in which the notification can be received from the image forming apparatus, and a second power mode in which the notification cannot be received from the image forming apparatus and less power is consumed than in the first power mode, and
    wherein the case where the image processing apparatus recovers to the state in which the notification can be received from the image forming apparatus from the state in which the notification cannot be received, includes a case where the image processing apparatus is restarted and a case where the image processing apparatus recovers to the first power mode from the second power mode.

5. An image forming system in which an image forming apparatus and an image processing apparatus configured to generate image data based on a print job and input the image data to the image forming apparatus are connected to each other,
    wherein the image forming apparatus includes:
    a first calibration execution unit configured to execute first calibration;
    a notification unit configured to perform notification of an execution instruction for second calibration to the image processing apparatus based on execution of the first calibration by the first calibration execution unit;
    a determination unit configured to determine whether the notification performed by the notification unit has succeeded;
    a monitoring unit configured to monitor a state of the image processing apparatus when the determination unit determines that the notification has failed; and
    a notification retrying unit configured to retry the notification of the execution instruction for the second calibration to the image processing apparatus, in a case where the monitoring unit determines that the image processing apparatus is in a state in which the notification can be received, and
    wherein the image processing apparatus includes:
    a second calibration execution unit configured to execute second calibration; and
    a warning unit configured to perform a warning to prompt execution of the second calibration when the execution instruction for the second calibration notified from the image forming apparatus is received.

6. The image forming system according to claim 5,
wherein the image processing apparatus is configured to operate by switching between at least a first power mode in which the notification can be received from the image forming apparatus, and a second power mode in which the notification cannot be received from the image forming apparatus and less power is consumed than in the first power mode,
wherein the image processing apparatus further includes a transmission unit configured to transmit information indicating a state of the image processing apparatus to the image forming apparatus in response to a request from the image forming apparatus in the first power mode, and to ignore the request in the second power mode, and
wherein the monitoring unit is configured to request the image processing apparatus to transmit the information indicating a state of the image processing apparatus, determine that the image processing apparatus is in a state in which the notification cannot be received when the information is failed to be acquired, and determine that the image processing apparatus is in a state in which the notification can be received when the information is successfully acquired.

7. The image forming system according to claim 5,
wherein the image processing apparatus is configured to operate by switching between at least a first power mode in which the notification can be received from the image forming apparatus, and a second power mode in which the notification cannot be received from the image forming apparatus and less power is consumed than in the first power mode,
wherein the image processing apparatus further includes a transmission unit configured to transmit to the image forming apparatus information indicating whether the image processing apparatus is in the state in which the notification can be received, when a power mode of the image processing apparatus changes, and
wherein the monitoring unit is configured to determine whether the image processing apparatus is in the state in which the notification can be received based on the information indicating the state of the image processing apparatus transmitted from the image processing apparatus, when the power mode of the image processing apparatus changes.

8. An image forming apparatus configured to perform image forming based on image data input from an image processing apparatus configured to generate image data based on a print job, the image forming apparatus comprising:
a first calibration execution unit configured to execute first calibration;
a notification unit configured to perform notification of an execution instruction for second calibration to the image processing apparatus based on execution of the first calibration by the first calibration execution unit;
a first storage unit configured to store time information relating to the notification performed by the notification unit; and
a response unit configured to transmit the time information stored in the first storage unit to the image processing apparatus, in response to a request from the image processing apparatus.

9. An image forming apparatus configured to perform image forming based on image data input from an image processing apparatus configured to generate image data based on a print job, the image forming apparatus comprising:
a first calibration execution unit configured to execute first calibration;
a notification unit configured to perform notification of an execution instruction for second calibration to the image processing apparatus based on execution of the first calibration by the first calibration execution unit;
a determination unit configured to determine whether the notification performed by the notification unit has succeeded;
a monitoring unit configured to monitor a state of the image processing apparatus when the determination unit determines that the notification has failed; and
a notification retrying unit configured to retry the notification of the execution instruction for the second calibration to the image processing apparatus, in a case where the monitoring unit determines that the image processing apparatus is in a state in which the notification can be received.

10. The image forming apparatus according to claim 9, wherein the monitoring unit is configured to request the image processing apparatus to transmit information indicating the state of the image processing apparatus, determine that the image processing apparatus is in a state in which the notification cannot be received when the information is failed to be received, and determine that the image processing apparatus is in a state in which the notification can be received when the information is successfully received.

11. The image forming apparatus according to claim 9, wherein the monitoring unit is configured to determine whether the image processing apparatus is in the state in which the notification can be received based on information indicating the state of the image processing apparatus transmitted from the image processing apparatus, when a power mode of the image processing apparatus changes.

12. A method for controlling an image forming system in which an image forming apparatus and an image processing apparatus configured to generate image data based on a print job and input the image data to the image forming apparatus are connected to each other,
the method executed by the image forming apparatus comprising:
executing first calibration;
performing notification of an execution instruction for second calibration to the image processing apparatus based on execution of the first calibration by a first calibration execution unit;
storing time information relating to time at which the first calibration execution unit executes the first calibration, in a first storage unit; and
transmitting the time information stored in the first storage unit to the image processing apparatus, in response to a request from the image processing apparatus, and
the method executed by the image processing apparatus comprising:
executing second calibration;
acquiring the time information from the image forming apparatus;
storing the acquired time information in a second storage unit; and
performing a second warning to prompt execution of the second calibration, in a case where the acquired time information indicates a date and time later than a date and time indicated by previously acquired time information that has been stored in the second storage unit.

13. A method for controlling an image forming system in which an image forming apparatus and an image processing apparatus configured to generate image data based on a print job and input the image data to the image forming apparatus are connected to each other,
- the method executed by the image forming apparatus comprising:
  - executing first calibration;
  - performing notification of an execution instruction for second calibration to the image processing apparatus based on execution of the first calibration by a first calibration execution unit;
  - determining whether the notification has succeeded;
  - monitoring a state of the image processing apparatus when the notification has been determined to have failed;
  - retrying the notification of the execution instruction for the second calibration to the image processing apparatus, in a case where the image processing apparatus is determined to be in a state in which the notification can be received, and
- the method executed by the image processing apparatus comprising:
  - executing second calibration; and
  - performing warning to prompt execution of the second calibration when the execution instruction for the second calibration notified from the image forming apparatus is received.

* * * * *